(No Model.) 7 Sheets—Sheet 1.
J. R. SEVERANCE.
GRAIN BINDER.

No. 452,459. Patented May 19, 1891.

WITNESSES=
H. G. Phillips.
A. Sorge Jr.

INVENTOR=
James R. Severance,
by Geo. B. Selden,
Atty.

(No Model.) 7 Sheets—Sheet 2.

J. R. SEVERANCE.
GRAIN BINDER.

No. 452,459. Patented May 19, 1891.

WITNESSES:
H. G. Phillips.
A. Sorge Jr.

INVENTOR:
James R. Severance,
by Geo. B. Selden,
Atty.

(No Model.)

J. R. SEVERANCE.
GRAIN BINDER.

No. 452,459.

7 Sheets—Sheet 3.

Patented May 19, 1891.

WITNESSES-
H. G. Phillips.
A. Sorgg Jr.

INVENTOR-
James R. Severance,
by Geo. B. Selden,
Atty.

(No Model.)　　　　　　　J. R. SEVERANCE.　　　　　7 Sheets—Sheet 4.
GRAIN BINDER.
No. 452,459.　　　　　　　　　Patented May 19, 1891.
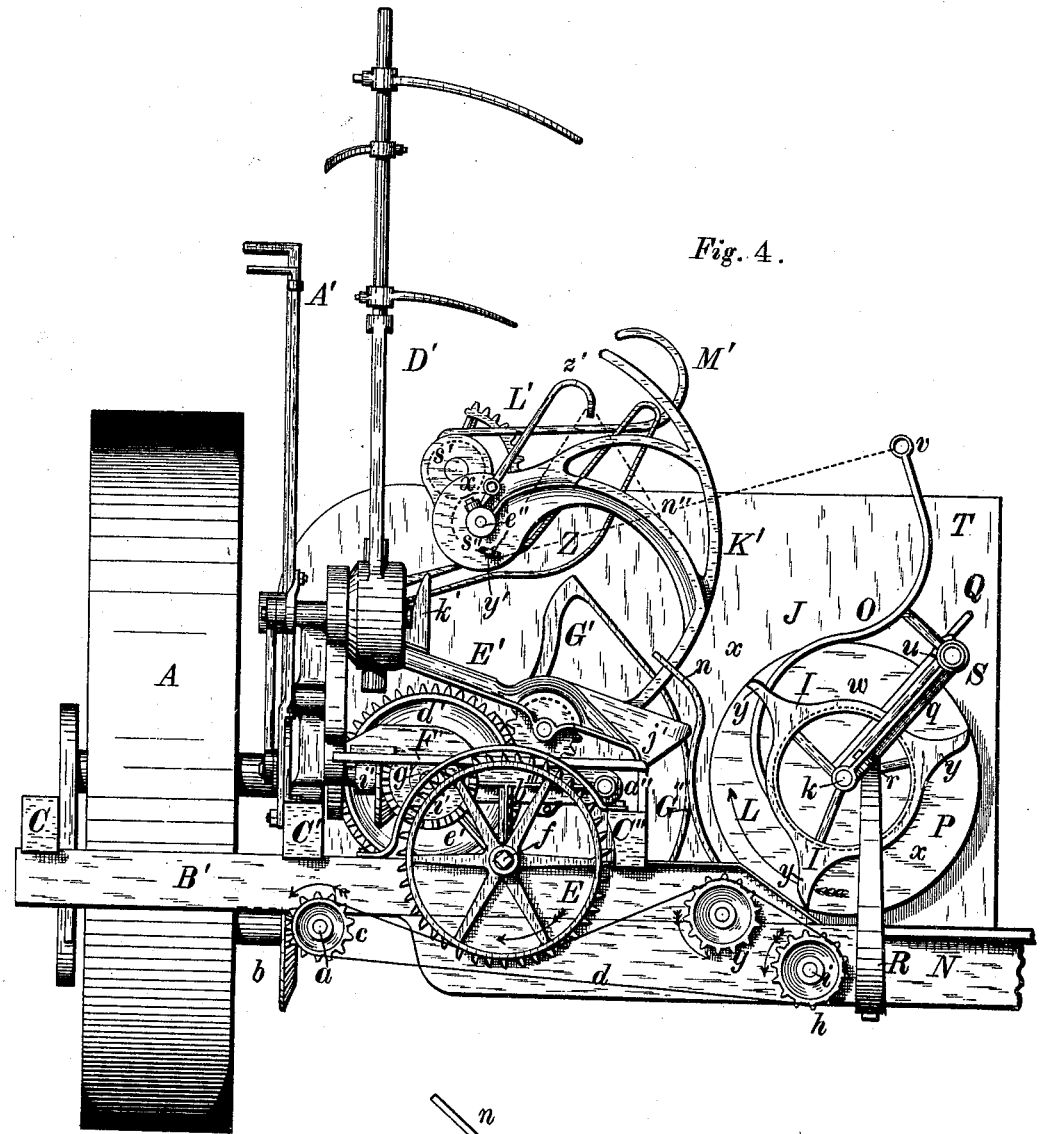
WITNESSES—
H. G. Phillips.
A. Sorge Jr.
INVENTOR—
James R. Severance,
by Geo. B. Selden,
atty.

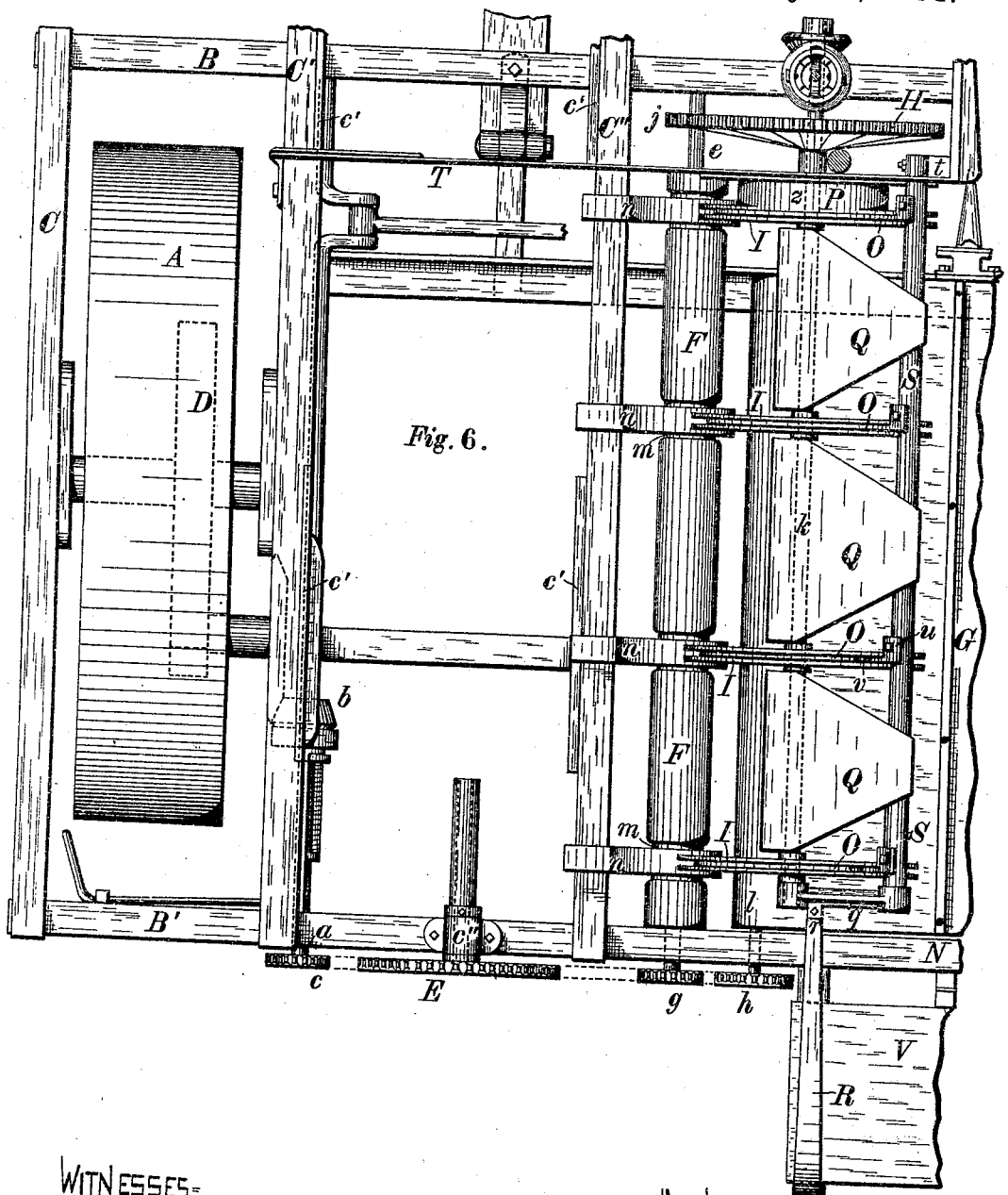

(No Model.) 7 Sheets—Sheet 6.
J. R. SEVERANCE.
GRAIN BINDER.
No. 452,459. Patented May 19, 1891.
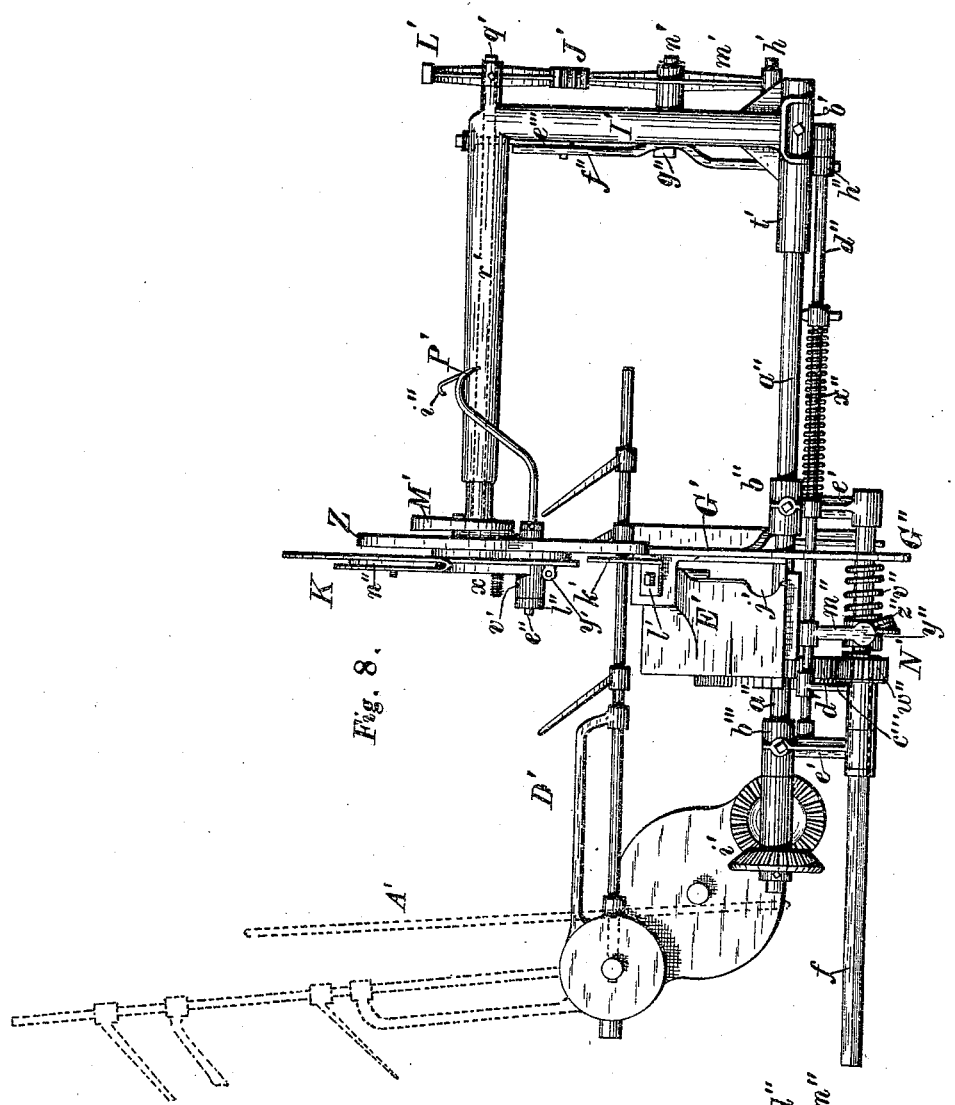
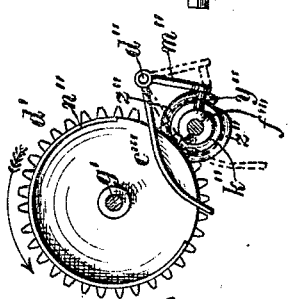
WITNESSES=
H.G. Phillips.
A. Sorge Jr.
INVENTOR=
James R. Severance,
by Geo. B. Selden,
Atty.

(No Model.)

J. R. SEVERANCE.
GRAIN BINDER.

No. 452,459.

Patented May 19, 1891.

WITNESSES=
H. G. Phillips.
A. Sorge Jr.

INVENTOR=
James R. Severance,
by Geo. B. Selden,
atty.

UNITED STATES PATENT OFFICE.

JAMES R. SEVERANCE, OF POUGHKEEPSIE, NEW YORK, ASSIGNOR OF TWO-THIRDS TO WILLIAM D. BALDWIN, OF MONTCLAIR, NEW JERSEY, AND JOHN O. ADSIT, OF HORNELLSVILLE, NEW YORK.

GRAIN-BINDER.

SPECIFICATION forming part of Letters Patent No. 452,459, dated May 19, 1891.

Application filed December 2, 1886. Renewed April 15, 1891. Serial No. 388,989. (No model.)

*To all whom it may concern:*

Be it known that I, JAMES R. SEVERANCE, a citizen of the United States, residing at Poughkeepsie, in the State of New York, have invented certain Improvements in Grain-Binders, of which the following is a specification, reference being had to the accompanying drawings.

My present invention relates to certain improvements in low-down binders of that type or class which has been represented in my previous patents and applications.

My improvements consist in improved means for operating the binder-arm, an improved compressor, and devices connected therewith, in an improved construction of the feeding apparatus, and in certain other improvements hereinafter more fully described.

My invention is fully described and illustrated in the following specification and accompanying drawings, and the novel features thereof specified in the claims annexed to the said specification.

My improvements in grain-binders are represented in the accompanying drawings, in which—

Figure 1:
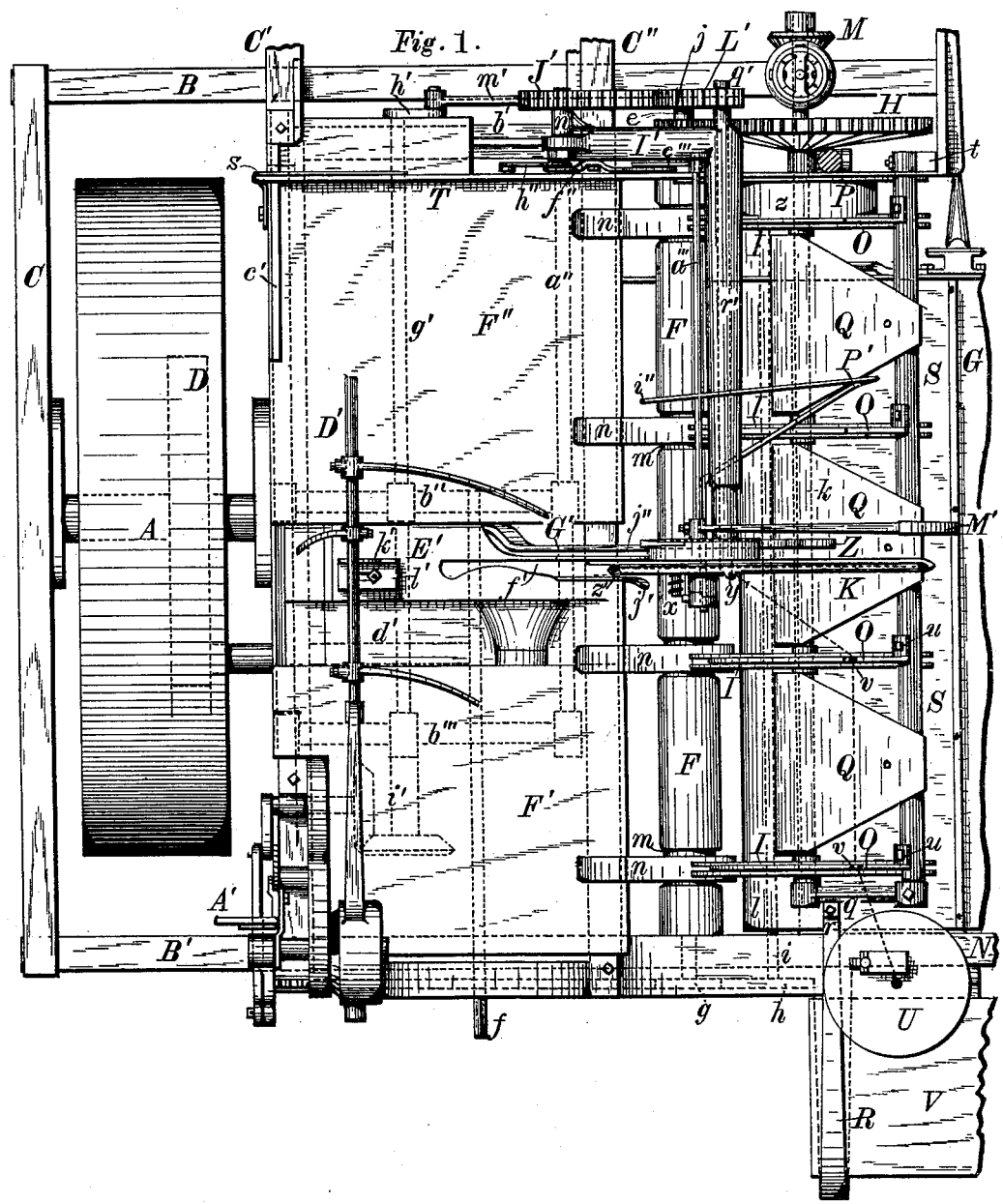
Figure 2:
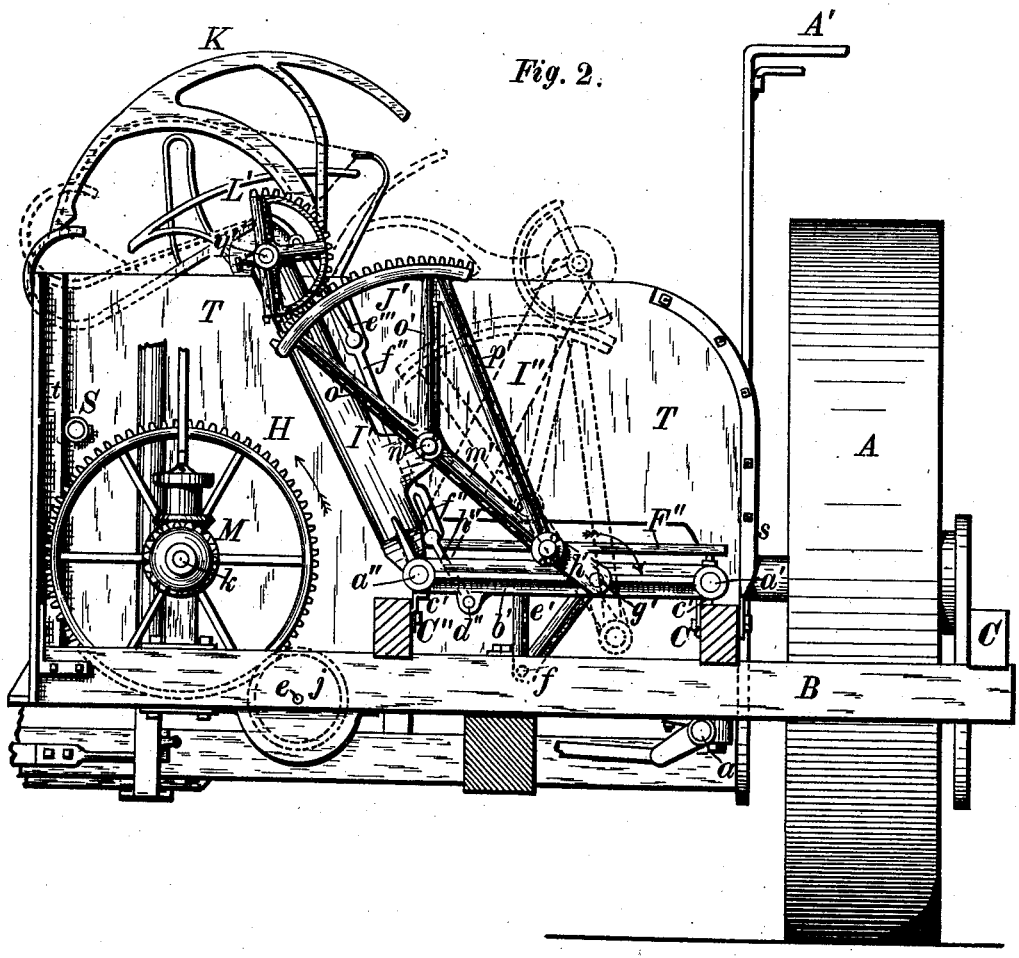
Figure 3:
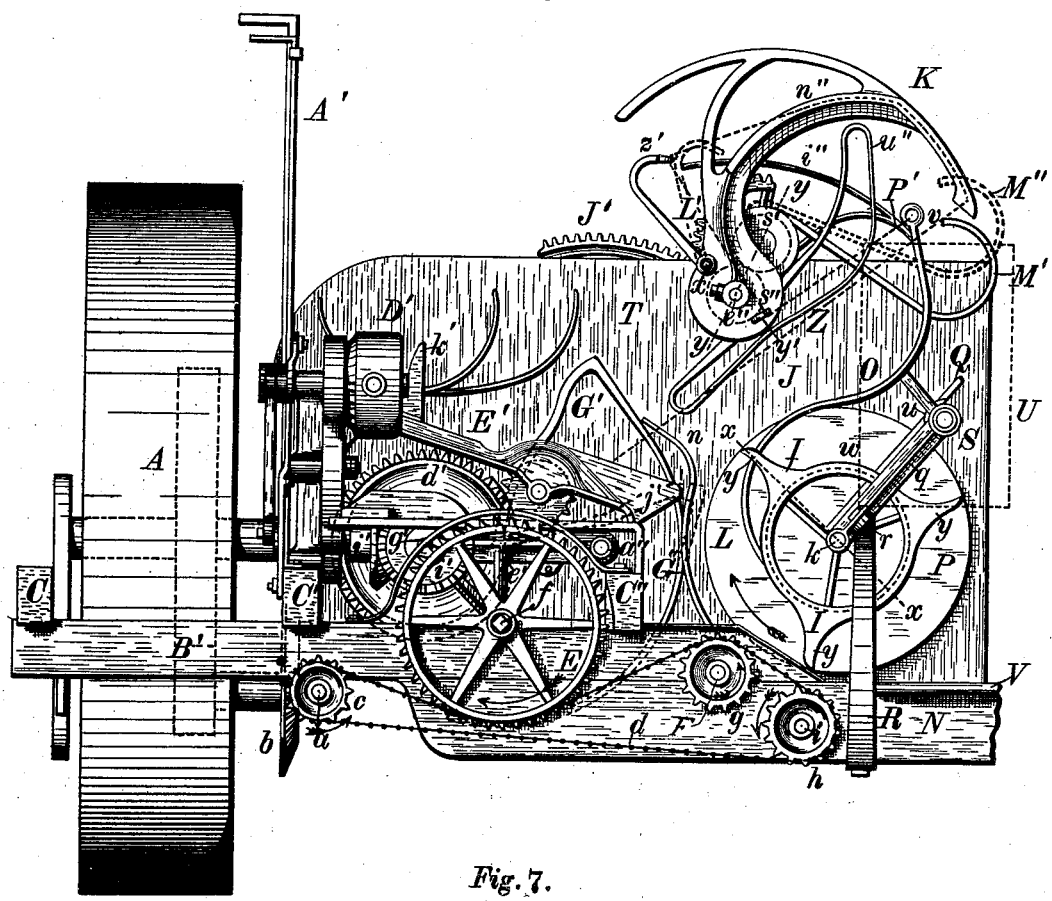
Figure 7:
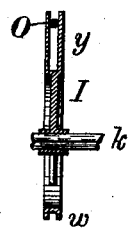
Figure 9:
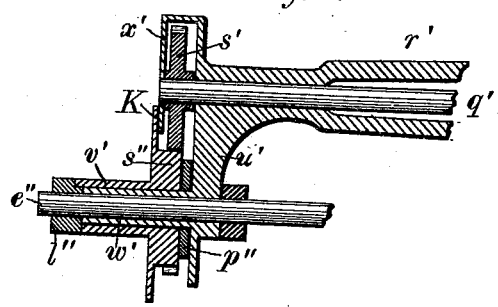
Figure 10:
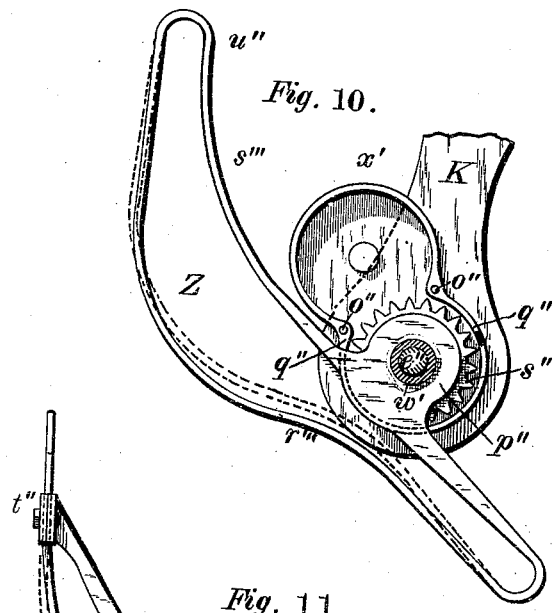
Figure 11:
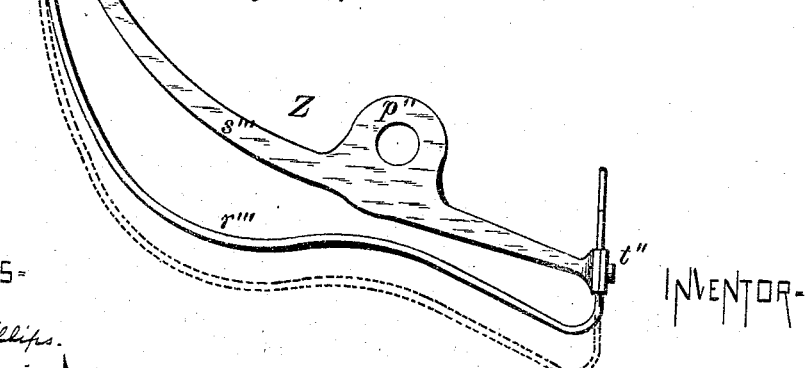

Figure 1 is a plan view, the grain-platform being broken off, so that only a portion of it is shown. Fig. 2 is a front elevation showing the binder-arm and its operating devices at rest, or in the position in which the grain is fed into the receptacle. Fig. 3 is a rear elevation of the same, showing the parts in the same position as in Fig. 2. Fig. 4 is a rear elevation of the machine, showing the binder-arm, compressor, &c., in the positions occupied by them at the extremity of their travel toward the driving-wheel. Fig. 5 is a section through the clearance-roller, showing the spring-guides, which form one side of the throat. Fig. 6 is a plan view, the binding machinery being removed. Fig. 7 is a section through one of the feeders on the line $x\ x$, Fig. 3. Fig. 8 is a side elevation of the binding mechanism detached as seen from the grain side of the machine. Fig. 9 is a section on the line $y\ y$, Fig. 2. Fig. 10 represents the compressor-gear casing and a portion of the binder-arm detached. Fig. 11 represents a modification of the compressor. Fig. 12 is a diagram representing the operation of the clutch-shifter.

In the operation of my improved grain-binder the grain is conveyed along the platform by a conveyer-belt of any ordinary construction and at the end of the platform is fed upward by a feeding device, which forces it through a suitable throat into a receptacle located partially above the feeder and on the side of the throat next the platform and from which receptacle the grain is carried by the movement of the binder-arm to the binding-table, where it is compressed and bound, the bound bundle being subsequently discharged in rear of the machine and deposited on the ground butts first by my improved swinging bundle-discharger. The knot-tyer employed in my present machine having been fully represented in my patent, No. 382,773, dated May 15, 1888, does not require to be described in detail here. The bundle-discharger also having been shown in my patent, No. 277,356, dated May 8, 1883, and in my application, Serial No. 217,390, filed October 28, 1886, need not be more particularly specified here.

A grain-binding machine embodying my present improvements consists, essentially, as usual in this class of machinery, of a suitable frame-work mounted on a driving-wheel A and a grain-wheel at the end of the platform being provided with suitable cutting apparatus, draft attachments, and means for handling the grain along the platform and delivering it to the binding devices. Provision is also made for tilting the platform and for raising and lowering the machine on the wheels to vary the height of the stubble, which may be accomplished in any ordinary or preferred way.

The frame of my improved grain-binder consists of the transverse sills B B' and the longitudinal timbers C C' C'', firmly bolted and braced together, as shown. The driving-wheel A is mounted between the timbers C C' in suitable guides or ways, which permit the raising or lowering of the machine. A spur-gear D, Fig. 1, on the driving-wheel meshes with a pinion, which transmits movement to the shaft $a$ by means of the bevel-gears $b$. The shaft $a$ extends underneath the sills, being supported therefrom by suitable boxes, and is provided at its forward end with a crank, which operates the knife-bar by a pitman, and at its rear end with a sprocket-pinion $c$, which, by means of the chain $d$ and gear E, drives the binder-actuating shaft $f$, and also the clearance-roller F by the sprocket-wheel $g$, and the driving-roller $l$ of the conveyer-belt G by the sprocket-wheel $h$. The front gudgeon $e$ of the clearance-roller carries a pinion $j$, Figs. 1 and 2, which meshes with the gear H on the shaft $k$ of the feeders I I I and serves to give the latter a continuous rotary movement, by which the grain is fed upward into the receptacle J within the grasp of the binder-arm K. This construction secures the direct application of the power of the driving-wheel to the work to be accomplished and reduces the cost of manufacture by reason of the reduction of the number of parts.

The bevel-gear $b$ is connected with the driving-pinion by a sleeve revolving on a stud attached to the frame-work. Provision is made for driving the reel from the forward end of the feeder-shaft $k$ by means of the bevel-gears M, Fig. 2. The rear sill N of the platform is secured to the frame-sill B′, and the angle-bar at the front of the platform is extended inward and attached to the timbers C′ C″ and to the sill B by suitable brackets and braces.

The platform is provided with the usual cutting apparatus at its front edge and at the outer end with a grain-wheel attached to the platform in such a manner that the machine can be raised and lowered.

G is the conveyer-belt, which is of ordinary construction and serves to carry the cut grain toward the feeders, being driven by the roller $l$, Fig. 1, on the shaft $i$.

The clearance-roller F is placed across the machine parallel with the delivery end of the conveyer-belt and at a short distance therefrom. As already mentioned, the clearance-roller F is driven at its rear end from the chain $d$ by the sprocket-wheel $g$, being arranged to rotate in the direction indicated by the arrows in Figs. 2 and 3, so that its side next the conveyer-belt moves upward. At suitable distances throughout its length the clearance-roller is provided with grooves $m$, Fig. 1, in which the spring-guides $n$ are located, which practically form one side of the throat through which the grain passes on its way to the receptacle. The arrangement and construction of the spring-guides $n$ are shown in Fig. 5, from which it will be seen that they are attached to the timber C″ by brackets $o$, and at their lower ends are provided with the projecting fingers $p$, which prevent the grain from falling down between the clearance-roller and the roller $l$ of the conveyer-belt. The spring-guides are made of a shape substantially as shown in the drawings, their surface being flush with that of the clearance-roller and their upper portions bent away from the feeders I.

The feeding mechanism by which the grain is carried upward through the throat into the receptacle consists, essentially, of a series of toothed wheels or feeders I I I, arranged to revolve in the proper direction with the shaft $k$ and the ribs or curved clearer-bars O O O, which detach the grain from the teeth of the feeders and form a skeleton bottom and side for the grain-receptacle J. At its forward end the feeding mechanism is also provided with the revolving disk P, which forms a traveling end board and assists by the friction between it and the butts of the grain in feeding the grain upward through the throat.

As indicated in Fig. 1, the feeders I I are placed on the shaft $k$ opposite the spring-guides $n$. Between the feeders are placed the guards Q Q Q, which prevent the grain from coming in contact with the shaft $k$. The guards Q Q also operate to cause any short or loose grain which may fall downward between the ribs O O to be delivered into the mouth of the throat. At its rear end the shaft $k$ is supported in a journal in the arm $q$, which is attached to the upper extremity of the bracket R, which is fastened to the sill N, and is curved backward so as to permit the heads of unusually long grain to pass through. The arm $q$ is fastened to the bracket at $r$ and extends upward at an inclination, its upper end being attached to the rod or pipe S, which supports the ribs O and the guards Q Q. The forward end of the tube S is secured to a post $t$, Figs. 1 and 2, to which the inner divider-board and the end board T are secured. The other end of the end board T is attached to the timber C′ by a suitable bracket $s$, Fig. 2. The ribs O are provided with suitable feet $u$, which are bolted to the tube S. As indicated in the rear views, Figs. 3 and 4, the ribs O extend upward above the tube S, being given a shape adapted to form the grain-receptacle J, and the upper ends of the ribs located between the twine-box U and the binder-arm K are formed into eyes $v$, through which the cord is led. The twine-box is fastened to the bracket R and its cover is provided with any usual tension device. The lower ends of the ribs O are bent inward toward the shaft $k$ and reach beyond the edges of the rims of the feeders I I. The feeders, as shown, are provided with double rows of projecting teeth $y\ y$, which as they revolve pass close by the sides of the ribs and on each side of the same. The teeth $y\ y$ of the feeders seize the grain from the conveyer-belt G and carry it upward through the throat L between the feeders and the spring-guides $n$, the ribs operating to slide the grain off of the teeth as it passes into the receptacle J. Any suitable number of feeders may be employed; but I have found that four, as shown in the drawings, operate well in practice. The forward edges of the teeth $y\ y$ are curved backward, as indicated in the drawings, for the purpose of facilitating the separation of the grain from them in the receptacle. The rims $w$ of the feeders are attached to the shaft $k$ by spokes and hubs. The teeth of all of the feeders are placed in rows, which act on the grain simultaneously throughout its whole length. Any suitable number of teeth may be employed on the feeders; but I have found that three on each, as shown, are sufficient in practice. The feeder next the revolving disk P is connected with the disk by a drum $z$, Fig. 1, of a size about the same as that of the rim $w$, so that the straw is prevented from accumulating between the feeder and the disk. The disk P revolves with the shaft $k$ inside the end board T, and, as already mentioned, serves to prevent friction between the butt-ends of the straw and the board and materially assists in feeding the grain into the receptacle, and, although the drum $z$ is not essential to the operation of the disk, it is useful in connection therewith in preventing any accumulation of straw, grass, or weeds at the forward end of the feeders.

The rear side of the platform may be provided with a hinged board V, which is turned down when the machine is cutting long grain. With reference to the binding mechanism proper, it should be observed, in the first place, that all its operative parts, including the bundle-discharger, are driven from the shaft $f$, and that the whole binder-frame and attachments are so mounted on the timbers C′ C″ that they can be adjusted forward or backward to adapt the machine to binding grain of different lengths centrally. The binder-frame consists of the parallel rods $a'$ $a''$, connected together by the frame-pieces $b'$ $b''$ $b'''$. The binder-frame is arranged to slide on suitable ways $c'$ $c'$ $c'$ $c'$ on the timbers C′ C″, a hand-lever A′ being provided for adjusting it. The frame is held down on the ways by suitable clips. The shaft $f$ is squared or splined through the hub or sleeve of the gear E, so as to permit the adjustment of the binder. The gear E is arranged to revolve in a suitable journal-box $c''$, Fig. 6, on the rear sill B′. The shaft $f$ is supported in journals in the brackets $e'$, Figs. 2, 3, and 4, depending from the frame-pieces $b''$ $b'''$. A pinion on the shaft $f$ meshes with a gear $d'$, Fig. 3, on the main shaft $g'$ of the binder, which operates the knotter, the binder-arm, and the bundle-discharger. The shaft $g'$ is provided at its forward end with a crank $h'$, which actuates the swinging binder-post and the binder-arm, and at its rear end it operates the bundle-discharger D′ by means of the bevel-gears $i'$.

The knotter is of substantially the same construction and operation as that shown in my former patents, and in my patent, No. 382,772, dated May 15, 1888, the knotter is located immediately below the knotter-plate E′, which is slotted, as shown at $f'$, to receive the binder-arm. The knotter-plate is raised a short distance above the binding-table F′ F″, being made of a shape adapted to inclose the various operative parts of the knotter. The sides of the space occupied by the knotter may be inclosed to keep the knotter free from straw. The function and construction of the gate G′ are also shown and described in my application, Serial No. 217,390, filed October 28, 1886. The cam for operating the gate is placed on the binder-shaft $g'$ and constructed substantially as shown in the said last-mentioned application.

The binder-table consists of the removable sections F′ F″, which are arranged to be easily taken off in order to give access to the parts underneath them. On each side of the slot $f'$ on the end of the knotter-case next the feeding mechanism the plates $j'$ $j''$ serve to guide the cord and insure the entrance of the binder-arm into the slot. The plates $j'$ $j''$ are cast in one piece with the knotter-casing or secured thereto by screws or rivets, and either or both may be flared outward for the purpose mentioned. Near the end of the knotter-casing next the driving-wheel is placed the detent $k'$, which assists in the formation and compression of the bundle, as hereinafter described. The detent is attached to the knotter-casing by the slotted foot $l'$ and a bolt or screws, which permit the adjustment of the detent to and from the binding-arm.

The construction of the mechanism for operating the binding-arm K will be best understood by an examination of the front view, Fig. 2. The binder-arm is carried by the swinging binder-post I′, which is pivoted on the forward end of the rod $a''$ of the binder-frame and receives a swinging movement, as indicated by the full and dotted lines I′ I″, Fig. 2, from the crank $h'$ by the gear-bearing link $m'$. The lower end of the link $m'$ is journaled on the crank $h'$, and the upper end is pivoted to the swinging post I′ by the stud $n'$, attached to the post or to a lug thereon. A segmental gear J′ is rigidly connected with the link $m'$ by the radii $o'$ $o'$ and the brace $p'$, the whole being preferably cast in one piece. The segmental gear J′ meshes with the segmental pinion L′, secured on a shaft $q'$, which extends through the horizontal extension or sleeve $r'$, Fig. 1, of the binder-post and serves to vibrate the binder-arm K on its pivot $e''$ by means of the gears $s'$ $s''$.

In Figs. 1, 2, and 3 the binder-arm and the attachments by which it is operated are shown in full lines in the position occupied by them when the arm is at rest and the grain is being fed into the receptacle, while the relative positions of the same parts are shown in Fig. 4 in full lines in the positions they occupy near the completion of the operation of tying the knot. It will thus be seen that the binder-arm has a double movement, and that while it swings bodily with the binder-post on the pivot formed by the rod $a''$, it also has a vibration on its pivotal point $e''$, caused by the segmental gear J', pinion L', shaft $q'$, and gears $s'$ $s''$, in virtue of which its point descends and seizes the grain in the receptacle and carries it across the upper end of the throat onto the binding-table, carrying the cord around the gavel and placing it within the grasp of the knotting mechanism. As the crank $h'$ revolves it not only causes the post I' to swing toward the main driving-wheel, but it also causes the segmental gear to rock about the pivot $n'$, thus imparting a partial rotation to the pinion L', which is transmitted by the shaft $q'$ and the gears $s'$ $s''$ to the binder-arm. The movements of the binder-post and binder-arm are continuous during the revolution of the binder-crank; but they do not reach the limits of their oscillation at the same time. Thus when the parts occupy the positions represented by the full lines in Fig. 2 the crank $h'$ is passing the dead-point on the line, joining the stud $n'$ and the shaft $g$. The post is therefore at or near the limit of its swing and has a correspondingly slow motion. The binder-arm, however, at this point is well advanced on its downward swing and is moving rapidly. A similar variation takes place when the crank is passing the opposite center, the motion of the binder-arm being then rapid and upward. The direction of the motion is reversed by the interposition of the gears $s'$ $s''$, which also enable me to bring the pivotal point $e''$ of the needle nearer the knotter, thus avoiding a disadvantageous leverage, while securing ample room for the expanded butts of the bundle below the sleeve $r'$ of the binder-post.

The path described by the point of the binder-arm or needle is substantially like that shown in the diagram accompanying my patent of February 1, 1881; but the mechanism by which such movement is secured is much simplified.

As indicated in Fig. 8, the lower end of the binder-post is made in the form of a yoke, which is pivoted on the rod $a''$ and embraces the end of the frame-piece $b'$. The inner arm of the yoke is extended inward along the rod $a''$, so as to form a long sleeve-bearing $t'$, which sustains the binder-post firmly during its vibration. The gear $s'$ is fastened on the end of the shaft $q'$, and the gear $s''$ is cast with or secured to the binding-arm.

The construction of the parts will be readily understood from an examination of the sectional view, Fig. 9. The sleeve $r'$ is cast with a flange $u'$, which projects downward and carries the stud $w'$, on which the hub $v'$ of the binder-arm K is pivoted. The casing $x'$ surrounds the gears $s'$ $s''$, its edge being cut away, so as to allow the compressor Z to swing on the stud $w'$. The casing $x'$ is made of the proper form to inclose the gears $s'$ $s''$, and is virtually a cap which is fitted against the flange $u'$, and protects the gears from straw or dirt.

Fig. 10 represents the casing $x'$, compressor Z, and a portion of the binding-arm detached, as seen from the side which is attached to the sleeve of the binder-post. The casing is attached to the flange by screws or bolts at $o''$ $o''$, Fig. 10. The compressor Z consists of a peculiarly-formed double strip of metal constructed so as to yield upward or toward the pivot of the binder-arm and provided with a plate or socket $p''$, Figs. 9 and 10, which fits the hub $w'$, so that it is free to swing thereon to a certain extent, which is limited by the stops $q''$ $q''$, formed by the edges of the cut-away portion of the casing $x'$. The stops may be formed on the flange $u'$. As indicated in Fig. 10, the compressor is formed in one piece, the lower arm $r''''$ of it being elastic, so as to yield in the operation of compressing the gavel, as indicated by the dotted lines.

In Fig. 11 I have represented a modified form of the compressor, in which the upper arm $s'''$, or that which is attached to the hub $w'$, is made separate from the elastic portion $r''$. This arrangement cheapens the construction of the compressor, as the upper arm and plate $p''$ may be cast, and also permits the lower or elastic arm $r'''$ to be adjusted by means of the screws or bolts $t''$, as indicated by the full and dotted lines in Fig. 11. The upper end $u''$ of the compressor is extended to a sufficient distance from the point of the binder-arm to prevent any straw from getting above it.

The operation of the compressor will be hereinafter described.

In order to prevent the gavel from twisting in either direction when it is swept from the receptacle J onto the binding-table by the binding-arm, I employ the butt-hook P', which partakes of the movements of the binder-arm and penetrates the gavel with its point and compels it to remain parallel or nearly parallel with the shaft of the binder-arm while traveling from the receptacle to the binding-table. The butt-hook may be attached in several different ways, so as to perform the function just mentioned; but in the drawings I have represented it as connected to or made in one piece with the shaft $e''$, which passes through the hub $w'$, on which the binder-arm is pivoted. As shown in Figs. 1, 3, and 8, the free end of the butt-hook is given a curved form, terminating in a point adapted to the purpose it is designed to accomplish, an upwardly-curved arm $i''$ being attached near the point in order to enable the hook to withdraw from the straw easily and to prevent its being entangled therein. If the butt-hook be given such a form that on its upward motion it will clear the sleeve $r''$, the shaft $e''$ may be secured to the hub $v'$ of the binder-arm; but under certain circumstances it may be advantageous to permit a small amount of lost motion between the binder-arm and the butt-hook, and this may be secured in any convenient way—as, for instance, by a collar $l''$, fastened on the shaft $e''$ and having a laterally-projecting jaw or lug, which engages in a recess in the hub $v'$, which recess is made enough wider than the lug or projection to allow the desired amount of lost motion between the arm and hook. The shaft $e''$ is provided with a collar just outside the flange $u'$.

The shape of the binder-arm is represented in Figs. 3 and 4. It is provided with a curved channel $n''$, along which the cord passes to the eye at the point of the arm. Near the pivot of the binder-arm is attached the eye $y'$, through which the binding-cord is led from the eyes $v$ on the upward extensions of the ribs O. The cord passes from the eye $y'$ to the ring at the end of the spring take-up $z'$, and thence through the channel $n''$ to the eye of the needle or binder-arm. The spring take-up consists of an arm pivoted at $x$ to the binder-arm and provided with a spring, which maintains the cord in the proper state of tension.

M$'$ is the bundle-sizer or trip-lever, which is raised by the accumulation of grain in the receptacle, and is connected with the clutch N$'$, Fig. 8, on the shaft $f$, so as to start the binding mechanism in operation when sufficient grain for a bundle has been fed into the receptacle. The outer end of the trip-lever is curved or bent upward, as shown in the drawings, for the purpose of preventing any grain getting above it. It is secured to a rod $a'''$, Fig. 1, passing along the sleeve $r'$ and sustained thereon by suitable journals. The movement of the trip-lever is transmitted to the rock-shaft $d''$, Figs. 2 and 8, by a system of connections, consisting of the arm $e'''$, lever $f'''$, pivoted to the binder-post at $g'''$, and the arm $h''$ on the rock-shaft $d''$. The arrangement is such that when the outer or free end of the trip M$'$ is raised by the grain accumulated underneath it the rock-shaft $d''$ is caused to rock, so that the arm $m''$, Fig. 8, attached thereto swings outward or away from the clutch N$'$. This movement of the arm $m''$ disengages a pin or stud on the inside of its outer end from a flange or rim on the clutch and permits the spring $v''$ to slide the clutch along the shaft $f$ until its teeth engage with teeth on the pinion $w''$, which meshes with the gear $d'$. The pinion $w''$ is loose on the shaft $f$; but the clutch N$'$ is splined on the shaft, so as to revolve therewith. The arm $m''$ is given a constant tendency to swing inward toward the clutch by the swing $x''$ on the rock-shaft $d''$. The disengagement of the pin $y''$ on the arm $m''$ from the flange $k''$ on the clutch causes the binding mechanism to perform the movements requisite for binding a single bundle, the clutch N$'$ being disengaged from the pinion $w''$ at the end of the binding operation by the pin on the arm $m''$ coming in contact with the inclined flanges $z''$ on the clutch. As the clutch revolves with the shaft $f$, it is caused to slide along the shaft out of engagement with the pinion $w''$ whenever one of the flanges $z''$ bears against the pin or roller $y''$ on the arm $m''$.

In order to hold the pin $y''$ on the arm $m''$ out of contact with the clutch, as indicated by the dotted lines in Fig. 12, I place on the gear $d'$ a segment of a circular rib $n''$, which bears against an arm $c'''$ on the rock-shaft $d''$ and holds the pin away from the clutch after it has once started until it has completed a revolution. The flange $k''$ is continuous and located inside the inclined or screw-shaped flanges $z''$. The inner end of these, however, come flush with the surface of the flange $k''$, so that as the clutch is disengaged from the pinion the pin or roller $y''$ may ride easily into contact with the continuous flange $k''$ under the influence of the spring $x''$. When the binding mechanism is at rest, the parts occupy the positions shown by the full lines in Fig. 12, the pin $y''$ bearing on the flange $k''$ and holding the teeth $f''''$ of the clutch out of engagement with the corresponding teeth on the side of the pinion $w''$, which is shown in Fig. 12 by dotted lines only.

When sufficient grain has been fed into the receptacle to raise the lever M$'$, the arm $m''$ is swung outward into the position represented by the dotted lines in Fig. 12, releasing the pin $y''$ from the flange $k''$ and allowing the clutch to be engaged with the pinion by the spring $v''$, which slides it along the shaft $f$. As soon as the gear $d'$ commences to rotate, the rib $n''$ on it comes in contact with the arm $c'''$ and holds it down and the arm $m''$ away from the clutch until the gear $d'$ has made a complete revolution, during which the binding of a bundle is completed. As soon as the gear $d'$ has turned around so that the cut-away portion of the flange $n''$ comes opposite the arm $c'''$, the spring $x''$ on the rock-shaft $d''$ throws the pin $y''$ into the path of the inclined flanges $z''$, and the clutch as it revolves is caused to slide along the shaft and disengage itself from the pinion $w'$, and the pin $y''$ travels inward toward the shaft, so that it bears against the continuous flange $k''$ and prevents the clutch from moving the binding mechanism until the lever M$'$ is raised by the accumulation of the grain for the next gavel in the receptacle.

The combination and arrangement of the tripping mechanism by which the bundle-sizer M$'$ operates the clutch N$'$ are substantially similar to that described in my patents, No. 237,135, dated February 1, 1881, and No. 345,546, dated July 13, 1886, and in my pending application, Serial No. 217,930.

The operation of my improved grain-binder is as follows: The cut grain is carried along the platform by the conveyer-belt G and fed up through the throat L by the revolving feeders I I into the receptacle J, the spring-guards $n$ yielding slightly, if necessary, to permit the passage of any unusual amount of straw. At this time the binding-arm and parts attached thereto occupy the positions shown in Fig. 3, the compressor Z occupying an inclined position, with its lower surface parallel or nearly parallel with the sides and bottom of the receptacle formed by the ribs O and the trip-lever resting in the position shown by the full lines M' until sufficient grain is fed into the receptacle to raise it up, as indicated by the dotted lines M', which movement is transmitted through the mechanism described to the arm m'' of the clutch N', thereby setting the binding mechanism into action. As soon as the shaft g' commences to revolve, the point of the needle-arm descends and embraces the grain in the receptacle, and the gate G' then moves downward, so as to be out of the way as the gavel is swept across the throat by the movement of the binding-arm. The gate G' is swung downward by a cam on the shaft g' until its point or angle comes just to the path of the binder-arm, as indicated by the dotted lines in Fig. 3, in which position it partially closes the throat and prevents any but a thin stream of grain, which is easily pierced by the point of the needle, from passing through it. The circular grain-guard G'', attached to the gate, prevents any straw from interfering with its movements. The compressor Z, carried by the post I, upon which it is loosely mounted, adapts itself to the position of the gavel as it is moved onto the binding-table, the final compressing of the gavel being effected between the compressor Z, the detent k', and the gate G', which rises after the bundle has passed the throat, as indicated in Fig. 4. While the straw occupies the space between the binding-table, the compressor Z, the detent k', and the gate G', the tying of the knot is effected. On the return movement of the binder-post I' the compressor slips off the bound bundle, which is discharged in the rear of the machine, as described in the patent and application before mentioned, by the bundle-discharger D'. As the binder-arm returns to the position of rest, it describes a path which causes its point to pass over the grain in the receptacle. The compressor Z serves as a cover to keep the grain in the receptacle, and also assists in the formation and compacting of the bundle. The compressor Z, being over and pressing upon the incoming gavel, prevents any unbound straw from being carried out with the bound bundle when it is lifted by the discharger. The spring-guards n yield or bend in a direction away from the receptacle when the gavel is swept across the throat, and in springing backward they help to separate any loose grain from the gavel and to cause it to be embodied in the next bundle.

I am aware that moving surfaces have been heretofore opposed to the butts of the grain, as shown, for instance, in the endless traveling and swinging butter-belt of Whitney, Patent No. 295,510, and the reciprocating toothed board of Colahan, No. 340,095, and such feature I do not claim broadly.

I am also aware that gears have been employed at the inner end of the binder-arm shaft to operate the compressor in a direction opposite to the motion of the binder-arm, as shown in patent to Locke, Reissue No. 8,863, dated August 19, 1879, and such construction I do not claim.

I claim—

1. The combination of the conveyer-belt G and the throat or passage-way L, extending inward and upward, open at its rear end and closed or partially closed at its forward end by the rotating disk P, and located between the rotary feeders I, having projecting teeth y y and the spring-guards n, the clearance-roller F, and the clearer-bars O O, substantially as described.

2. The combination, with the grain conveying and binding mechanism of a grain-binder, of the rotary feeders I I, provided with projecting teeth y y, the clearer-bars O O, extending across the path of the teeth and attached to the supporting-rod S, and the inclined guards Q Q, supported by the rod and located between the clearer-bars, substantially as described.

3. The combination, with the grain conveying and binding mechanism of a grain-binder, of suitable rotary feeding mechanism provided at the forward end with the revolving circular plate or disk P, arranged to revolve about a horizontal axis and opposed to the butts of the grain, substantially as described.

4. The combination, with the grain conveying and binding mechanism of a grain-binder, of the continuously-revolving feeders I I, provided with projecting teeth y y, the clearer-bars O O, extending across the path of the teeth, and the revolving plate or disk P, arranged to revolve on a horizontal axis and opposed to the butts of the grain, substantially as described.

5. The combination, with the grain conveying and binding mechanism of a grain-binder, of the continuously-revolving feeders I I, provided with projecting teeth y y, the spring-guards n, placed opposite the feeders, and the rotating disk P, opposed to the butts of the grain, substantially as described.

6. The combination, with the grain conveying and binding mechanism of a grain-binder, of the continuously-revolving feeders I I, provided with projecting teeth y y, the clearer-bars O O, extending outward and upward across the path of the teeth, the spring-guards n n, placed opposite the feeders and ribs, and the revolving disk P, opposed to the butts of the grain, substantially as described.

7. The combination, with the grain conveying and binding mechanism of a grain-binder, of the continuously-revolving feeders I I, the rotating disk P, opposed to the butts of the grain, and the drum z of smaller diameter than the disk and extending from the disk to the next adjacent feeder, substantially as described.

8. The combination, with the grain conveying and binding mechanism of a grain-binder, of the continuously-revolving feeders I I, the end board T, constituting the forward end of the gaveling and binding chambers, and the revolving disk P, opposed to the butts of the grain and arranged to revolve in a plane parallel with the plane of the end board, substantially as described.

9. The combination, with the grain conveying and binding mechanism of a grain-binder, of the continuously-revolving feeders I I, the spring-guards $n\ n$, placed opposite the feeders, the grooved clearance-roller F, and the rotating disk P, opposed to the butts of the grain, substantially as described.

10. The combination, with the grain conveying and binding mechanism of a grain-binder, of the continuously-revolving feeders I I, provided with teeth $y\ y$, the clearer-bars O O, extending across the path of the teeth, the rotating disk P, opposed to the butts of the grain, and the rearwardly-curved bracket R, arranged to support the rear end of the feeding mechanism, substantially as described.

11. The combination, with the grain conveying and binding mechanism of a grain-binder, of the continuously-revolving feeders I I, provided with projecting teeth $y\ y$, the clearer-bars O O, extending across the path of the teeth, shaft $k$, rotating disk P, opposed to the butts of the grain, clearance-roller F, and gearing connecting the shaft of the feeders and the clearance-roller, substantially as described.

12. The combination, in a grain-binder, of a binding-arm and its shaft supported on an overhanging swinging post and mechanism for swinging the post and vibrating the binding-arm, consisting, essentially, of the single revolving crank $h'$, the pinion $L'$, secured on the binding-arm shaft, the combined link $m'$, and segmental gear $J'$, pivoted on the crank and to the swinging post on a stud located between the crank and the shaft, whereby the gear is caused to operate the pinion and the binding-arm and also swing the supporting-post, substantially as described.

13. The combination, in the feeding mechanism of a grain-binder, of the front row of feeder-teeth of a rotary feeder, the grain guide or guard opposite the first row of feeder-teeth, operating to keep the straw in contact with the teeth, and the disk revolving with the feeder-teeth and forming a revolving end plate for the feeder mechanism, adapted to carry forward the butts of the grain, substantially as described.

14. The combination, with the swinging binder-arm post supporting the traveling and vibrating binder-arm K, of the swinging compressor Z, consisting of the relatively adjustable bars $r'''\ s'''$, one of which is pivoted to the post and having their free ends extending in each direction from the pivotal point, whereby the compressor is adapted to adjust itself to the gavel during the compressive operation and the amount of compression may be varied, substantially as described.

15. The combination, with the swinging binding-post $I'$, sleeve $r'$, flange $u'$, stud $w'$, of the shaft $q'$, binding-arm K, shaft $e''$, and butt-hook $P'$, substantially as described.

16. The combination, with the traveling and vibrating binder-arm K, of the compressor Z, a suitable binding-table, detent $k'$, and gate $G'$, substantially as described.

17. The combination, with a suitable throat and mechanism adapted to feed the grain therethrough, of a grain-receptacle and binding-table located on opposite sides of the throat, an overhung swinging binder-post supporting the binder-arm, adapted to transfer the grain from the receptacle to the binding-table, and mechanism for operating the binder-post and arm, consisting, essentially, of the crank $h'$, the combined link $m'$, and segmental gear $J'$, pivoted on the crank and on a stud on the binder-post, pinion $L'$, shaft $q'$, and gears $s'\ s''$, substantially as described.

18. The combination of the binder-post rocked by suitable mechanism, the compressor pivoted loosely on the post so as to rock freely on its pivot within fixed limits and adapted to operate as a cover for the measuring-receptacle when the post is at one extreme of its oscillation and as the cover of the binding-chamber when the post is at the opposite extreme of its oscillation, substantially as described.

19. In the binding-chamber of a grain-binder, the combination of the knotter-casing forming the bottom of the chamber, the compressor-gate forming the side of the chamber next the binder-arm, the detent forming the opposite side, and the compressor-cover carried on the rocking post and arranged to slide off the bundle to allow of its being lifted by the discharger, substantially as described.

JAMES R. SEVERANCE.

Witnesses:
 GEO. B. SELDEN,
 H. G. PHILLIPS.